(12) United States Patent
Kim

(10) Patent No.: US 9,699,287 B2
(45) Date of Patent: Jul. 4, 2017

(54) CONTENT SEARCH METHOD AND MOBILE TERMINAL

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 350 days.

(21) Appl. No.: 12/016,892

(22) Filed: Jan. 18, 2008

(65) Prior Publication Data

US 2008/0176606 A1    Jul. 24, 2008

(30) Foreign Application Priority Data

Jan. 19, 2007  (KR) .................. 10-2007-0006199

(51) Int. Cl.
  *H04M 1/02*    (2006.01)
  *H04M 1/725*    (2006.01)
  *G06F 17/30*    (2006.01)

(52) U.S. Cl.
  CPC .. *H04M 1/72522* (2013.01); *G06F 17/30994* (2013.01); *H04M 1/72544* (2013.01); *H04M 1/72558* (2013.01); *H04M 1/72583* (2013.01)

(58) Field of Classification Search
  CPC . G06F 9/4443; G06F 17/30994; H04L 29/06; H04M 1/72544; H04M 1/72522; H04M 1/72558; H04M 1/72583
  USPC ................................ 455/456.1, 414.2, 404.2
  See application file for complete search history.

(56) References Cited

U.S. PATENT DOCUMENTS

| | | | |
|---|---|---|---|
| 6,487,586 B2* | 11/2002 | Ogilvie ............... | G06Q 10/107 709/201 |
| 6,496,979 B1* | 12/2002 | Chen et al. ................... | 717/178 |
| 7,228,339 B2* | 6/2007 | Yamamoto et al. ......... | 709/217 |
| 7,444,135 B2* | 10/2008 | Klassen ..................... | 455/412.2 |
| 7,487,529 B1* | 2/2009 | Orlick ............................ | 725/42 |
| 7,500,198 B2* | 3/2009 | Mathews et al. ............. | 715/744 |
| 7,571,189 B2* | 8/2009 | Levin et al. | |
| 7,606,483 B2* | 10/2009 | Kurosawa ..................... | 396/299 |
| 7,614,001 B2* | 11/2009 | Abbott et al. ................ | 715/744 |
| 7,627,590 B2* | 12/2009 | Boguraev et al. | |
| 7,689,933 B1* | 3/2010 | Parsons ................. | G06F 3/0482 715/200 |
| 8,356,043 B2* | 1/2013 | Kimura ............... | G06F 3/03547 707/758 |
| 8,566,733 B2* | 10/2013 | Rhee .................. | G06F 17/30064 360/13 |
| 8,656,040 B1* | 2/2014 | Bajaj ................. | G06F 17/30613 382/312 |
| 8,799,818 B2* | 8/2014 | Kim .................. | G06F 17/30029 715/825 |
| 9,319,506 B2* | 4/2016 | Funabashi ......... | H04M 1/72519 |
| 2002/0054046 A1* | 5/2002 | Evans et al. .................. | 345/581 |

(Continued)

FOREIGN PATENT DOCUMENTS

KR   10-2006-0049936   5/2006
WO    2005/045588    5/2005

*Primary Examiner* — Tan H Trinh
(74) *Attorney, Agent, or Firm* — Lee Hong Degerman Kang & Waimey

(57) ABSTRACT

A content search method and a terminal using the same are provided. The method for displaying content in the mobile terminal includes displaying a content list including a plurality of different content files, receiving a request from a user, and displaying responsive to the request one of the plurality of different content files as a background media while the content list is displayed.

25 Claims, 6 Drawing Sheets

(56) References Cited

U.S. PATENT DOCUMENTS

| | | | |
|---|---|---|---|
| 2003/0078960 A1* | 4/2003 | Murren | H04L 29/06 709/203 |
| 2003/0142653 A1* | 7/2003 | Jiang et al. | 370/338 |
| 2003/0203731 A1* | 10/2003 | King | G06Q 30/04 455/407 |
| 2004/0080518 A1* | 4/2004 | Lee | 345/619 |
| 2004/0216054 A1 | 10/2004 | Mathews et al. | |
| 2005/0020359 A1* | 1/2005 | Ackley | A63F 13/10 463/31 |
| 2005/0034082 A1* | 2/2005 | Kim | G06Q 30/06 715/828 |
| 2005/0091597 A1* | 4/2005 | Ackley | 715/716 |
| 2005/0094672 A1* | 5/2005 | Jung | H04L 29/06027 370/486 |
| 2005/0111820 A1* | 5/2005 | Matsumi | G11B 20/1217 386/248 |
| 2005/0140566 A1* | 6/2005 | Kim et al. | 345/1.1 |
| 2005/0172154 A1* | 8/2005 | Short | H04H 60/23 726/5 |
| 2006/0058014 A1* | 3/2006 | Seo et al. | 455/418 |
| 2007/0043739 A1* | 2/2007 | Takai | G06F 17/30749 |
| 2007/0166683 A1* | 7/2007 | Chang | G09B 5/06 434/307 R |
| 2007/0256034 A1* | 11/2007 | Hiraoka | G06F 17/30398 715/864 |
| 2007/0281750 A1* | 12/2007 | Cox et al. | 455/567 |
| 2008/0005688 A1* | 1/2008 | Najdenovski | G06F 17/30053 715/765 |
| 2008/0016451 A1* | 1/2008 | Funabashi | G06F 3/04815 715/757 |
| 2008/0046831 A1* | 2/2008 | Imai | G06F 15/025 715/765 |
| 2008/0215999 A1* | 9/2008 | Kim et al. | 715/762 |
| 2008/0216020 A1* | 9/2008 | Plummer | G11B 27/105 715/841 |
| 2009/0005022 A1* | 1/2009 | Lehtiniemi et al. | 455/415 |
| 2009/0049471 A1* | 2/2009 | Kamiya | H04N 5/4401 725/39 |
| 2009/0156250 A1* | 6/2009 | Ang | 455/550.1 |
| 2009/0163182 A1* | 6/2009 | Gatti et al. | 455/414.1 |
| 2009/0177381 A1* | 7/2009 | Taniguchi | G01C 21/3679 701/454 |
| 2009/0253416 A1* | 10/2009 | Lee et al. | 455/414.1 |
| 2010/0005385 A1* | 1/2010 | Trabucco | G06F 17/3089 715/234 |
| 2011/0077861 A1* | 3/2011 | Arrasvuori et al. | 701/207 |

* cited by examiner

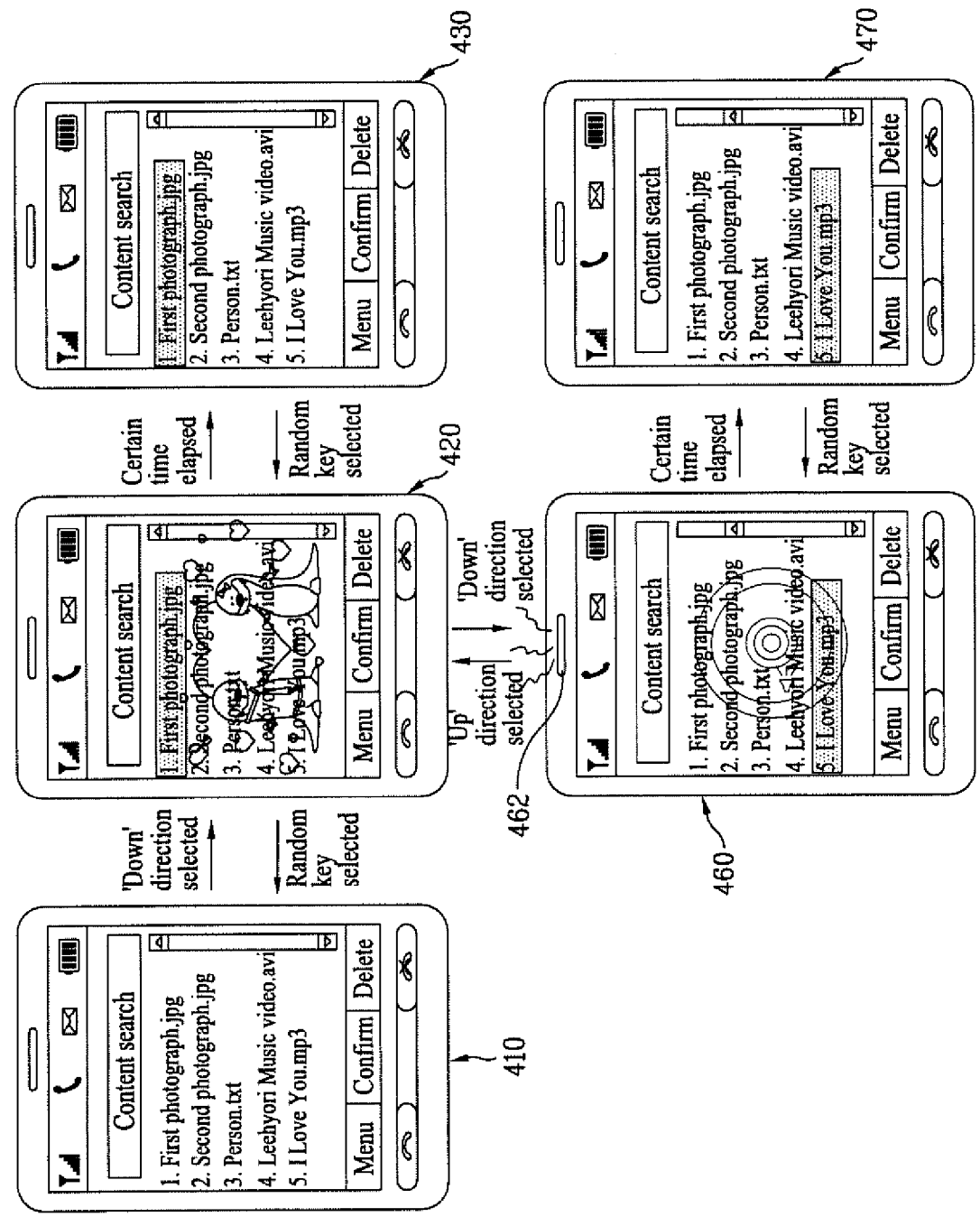

CONTENT SEARCH METHOD AND MOBILE TERMINAL

Pursuant to 35 U.S.C. §119(a), this non-provisional patent application claims the priority benefit of Korean Patent Application No. 10-2007-0006199, filed on Jan. 19, 2007, the entire contents of which are hereby incorporated by reference.

FIELD OF THE INVENTION

The present invention is directed to a method for searching content in a mobile terminal, and a mobile terminal for implementing the same.

DESCRIPTION OF RELATED ART

A content search process for a conventional mobile terminal is performed by the mobile terminal entering a content search mode to display a list of contents pre-stored in the terminal on a screen of the terminal. If one content is selected from the content list by the terminal user, the terminal displays the selected content distinguishably from the other contents of the contents list or executes the selected content. The terminal can distinguishably display the selected content by highlighting the selected content or positioning a cursor at the selected content.

However, a conventional mobile terminal cannot provide data contained in the selected content to the user during the content search process prior to execution of the content. For this reason, the user experiences trouble executing the selected content such that the terminal provides the data contained in the selected content to the user.

SUMMARY OF THE INVENTION

In one general aspect of the present invention, a method for displaying content in a mobile terminal includes displaying a content list including a plurality of different content files, receiving a request from a user for one of the plurality of different content files, and displaying the requested one of the plurality of different content files as a background media while the content list is displayed.

It is contemplated that the method further includes no longer displaying the requested one of the plurality of different content files after a predetermined time elapses. It is further contemplated that the plurality of different content files includes at least one of a video, audio, text, flash, and video/audio files.

It is contemplated that the method further includes displaying the at least one of the plurality of different content files as a background video when the requested one of the plurality of different content files comprises one of the video, text, and flash file. It is further contemplated that the method includes displaying the content list on a transparent area of a display screen and the background video on an opaque area of the screen, wherein the transparent area and the opaque area form a multilayer structure.

It is contemplated that the method further includes outputting data contained in the requested one of the plurality of different content files as a background audio when the requested one of the plurality of different content files comprises the audio file. It is further contemplated that the method includes displaying video data contained in the requested one of the plurality of different content files as a background video, and outputting audio data contained in the selected one of the plurality of different content files as a background audio when the requested one of the plurality of different content files comprises the video/audio file.

It is contemplated that receiving the request comprises receiving an input via a touched content list displayed on a touch screen of the mobile terminal. It is further contemplated that the method includes requesting a content search mode according to the user's selection.

In another general aspect of the present invention, a mobile terminal includes an input unit receiving user input, an output unit having a display, and a controller displaying on the display a content list including a plurality of different content files, processing a request from the input unit for one of the plurality of different content files and displaying the requested one of the plurality of different content files as a background media while the content list of the plurality of different content files is displayed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4B depicts various displays outputting data contained in a content as background media according to another embodiment of the present invention.

DETAILED DESCRIPTION OF PREFERRED EMBODIMENTS

In the following detailed description reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
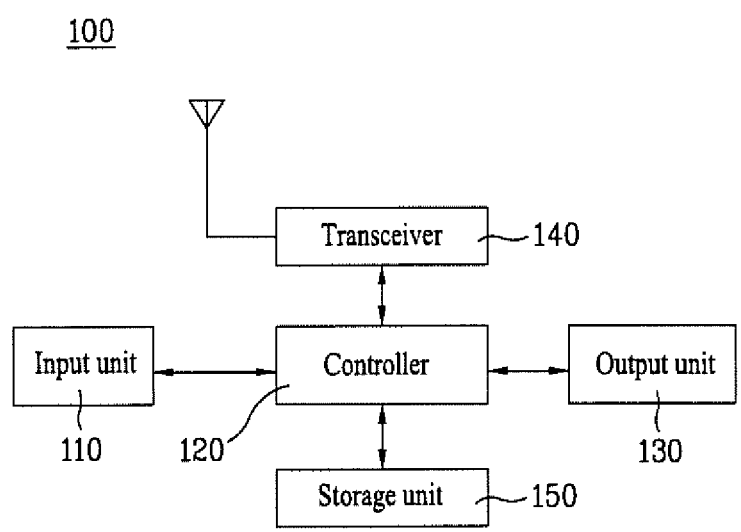
FIG. 1 is a block diagram of a mobile terminal having a content search function according to an embodiment of the present invention.

A content search terminal according to the present invention will hereinafter be described in detail with reference to FIG. 1. As illustrated in FIG. 1, the mobile terminal 100 includes an input unit 110, controller 120, output unit 130, transceiver 140, and storage unit 150.

The input unit 110 receives an input from the user of the mobile terminal 100 and generates a corresponding signal. Particularly, the input unit 110 generates a command signal for entry to a content search mode according to the user's selection. The term 'content search mode' refers to a mode for searching for a specific content stored in the storage unit 150.

The input unit 110 also selects content from a list of content displayed through the output unit 130 in response to a user's selection. Where the input unit 110 comprises a touch screen, the user can search for a desired content by selecting from the content displayed on the touch screen.

Each content includes at least one of a video, text, flash, audio and video/audio file. More particularly, the video file includes a still image file and a moving image file, the audio file includes a music file and a sound file, and the text file includes various document files.

By way of example, the still image file may have an extension of 'jpg', 'gif' or 'sis'. The moving image file may have an extension of 'skm', 'k3g', 'mp4' or 'avi'. The music file may have an extension of 'mp3', 'dcf', 'kmp', 'kcp', 'kpp' or 'ned'. The sound file may have an extension of 'mmf' or 'gap'. The document files may have an extension of 'hwp', 'doc', 'ppt', 'xis', 'pdf' or 'txt'. The flash file may have an extension of 'swf'.

The controller 120 controls the operation of the terminal 100. The controller 120 also controls the above-mentioned supporting elements, wherein they can be separately operated.

The output unit 130 outputs information related to the mobile terminal 100. The information may be either a video output or audio output. For example, the output unit 130 may output various information related to the mobile terminal 100 through a video output device (not shown) or audio output device (not shown), respectively. The output unit 130 may comprise a touch screen as an example of the video output device.

In an embodiment of the present invention, the controller 120 controls outputting data contained in the content selected through the input unit 110, based on the file type of the selected content. For example, when the file type of the selected content is one of video, text and flash file, the controller 120 controls the output unit 130, such as a video output device, to output the data contained in the selected content as a background video. When the file type of the selected content is the audio file, the controller 120 controls the output unit 130, such as an audio output device, to output the data contained in the selected content as a background audio.

Alternatively, when the file type of the selected content is the video/audio file, the controller 120 controls the output unit 130, such as a video output device and an audio output device, to output video data contained in the selected content as a background video and audio data contained in the selected content as a background audio.

The controller 120 also controls the output unit 130 to stop the outputting operation of the data contained in the selected content, after a certain predetermined time elapses. The predetermined time refers to a time preset to output the data contained in the selected content. For example, the predetermined time may be set to one second, five seconds or 10 seconds. Also, the predetermined time can be set by the user or as a default.

The transceiver 140 transmits and receives signals with an external terminal. The signals may be transmitted and received over a wired or wireless network.

The storage unit 150 stores all data inputted and outputted to/from the terminal 100 and all programs necessary for the operation of the terminal 100. Particularly, the storage unit 150 stores a plurality of contents, preferably by directories. The directories can be set arbitrarily by the user or may be set as defaults based on the file types of the contents.

Figure 2:
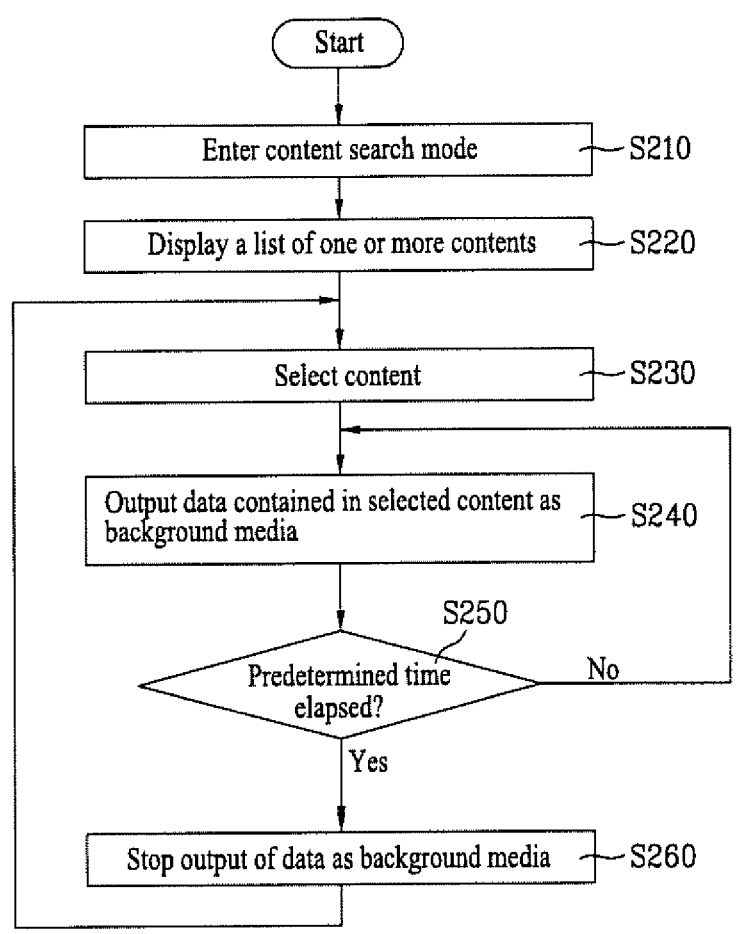
FIG. 2 is a flowchart schematically illustrating a content search process according to an embodiment of the present invention.
Figure 3:
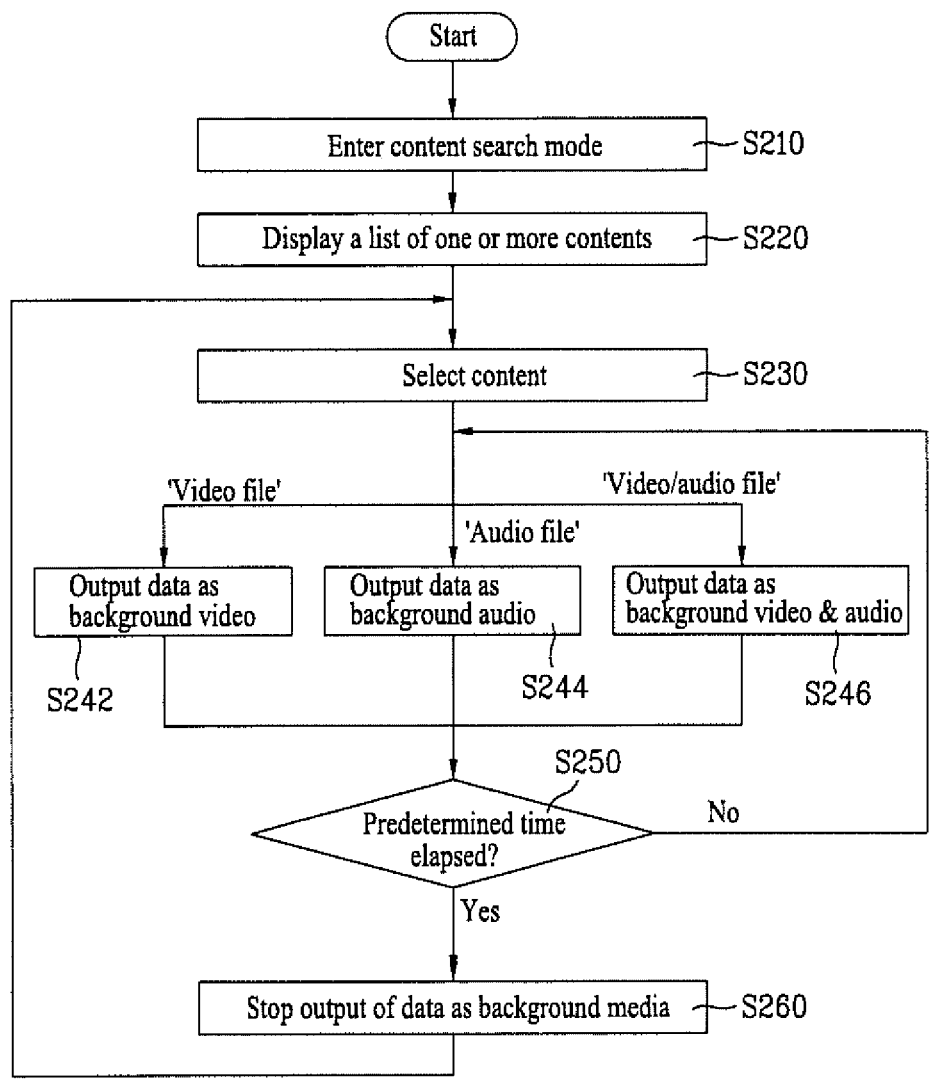
FIG. 3 is a flowchart illustrating another aspect of the content search process of FIG. 2.

A content search process according to the present invention will hereinafter be described in detail with reference to FIGS. 1-3. FIG. 2 is a flowchart schematically illustrating a content search process according to an embodiment of the present invention, and FIG. 3 is a flowchart illustrating another detailed aspect of the content search process of FIG. 2.

The mobile terminal 100 enters the content search mode according to the user's selection (S210). As the mobile terminal 100 enters the content search mode, the controller 120 performs a control operation to display a list content stored in the storage unit 150.

Alternatively, the controller 120 may perform a control operation to sort out and display contents stored in a specific directory from the content stored in the storage unit 150. The directory can be set by the user or as a default based on a content type or menu item.

The mobile terminal 100 displays a list of one or more contents on the screen (S220) (S320). Then, the mobile terminal 100 selects content from the displayed list in response to the user's selection (S230). For example, when the terminal 100 has a touch screen, content is selected by the user from the content list displayed on the touch screen. Alternatively, when the mobile terminal 100 has a content search key, any content may be selected from the displayed list in response to an operation of the content search key by the user.

The content search key can be provided on the side surface or front surface of the mobile terminal 100 in the form of a key button, jog shuttle, jog dial or scroll key. Alternatively, the content search key may be provided in the form of a scroll bar or touch wheel on a touch pad or touch screen. The content search key refers to all keys capable of performing a content search function and is not limited to the above key forms.

The mobile terminal 100 outputs data contained in the selected content as background media with respect to the screen on which the lists of the content are displayed (S240) (S242-S246). The mobile terminal 100 may output the data contained in the selected content on the screen using one of an On Screen Display (OSD), overlay, Picture In Picture (PIP), Picture Out Picture (POP), and Picture By Picture (PBP) mode.

Alternatively, the terminal 100 may output the data contained in the selected content on the full area of the display screen or a certain area of the screen. In this case, the data display area can be set by the user.

As another alternative, the terminal 100 may display the list of the content on a transparent area of the screen and the data contained in the selected content on an opaque area of the screen. The transparent area and the opaque area may form a multilayer structure.

The mobile terminal 100 determines whether a predetermined time preset to output the data contained in the selected content has elapsed (S250). Upon determining that the predetermined time has elapsed, the mobile terminal 100 stops the operation of outputting the data contained in the selected content (S260). If it is determined that the predetermined time has not elapsed, the mobile terminal 100 continues the operation of outputting the data contained in the selected content (S240) (S242-S246).

With reference to FIG. 3, a more detailed description will be given of the data output (S242-S246) by the file types of the selected content.

When the selected content is a video file, the mobile terminal 100 outputs video data contained in the video file as a background video (S242). Here, the background video refers to a background picture displayed on the mobile terminal 100.

Alternatively, although not shown in the drawing, when the selected content is a text file or flash file, the terminal 100 may output text contents contained in the text file or an image contained in the flash file as the background video.

Figure 4A:
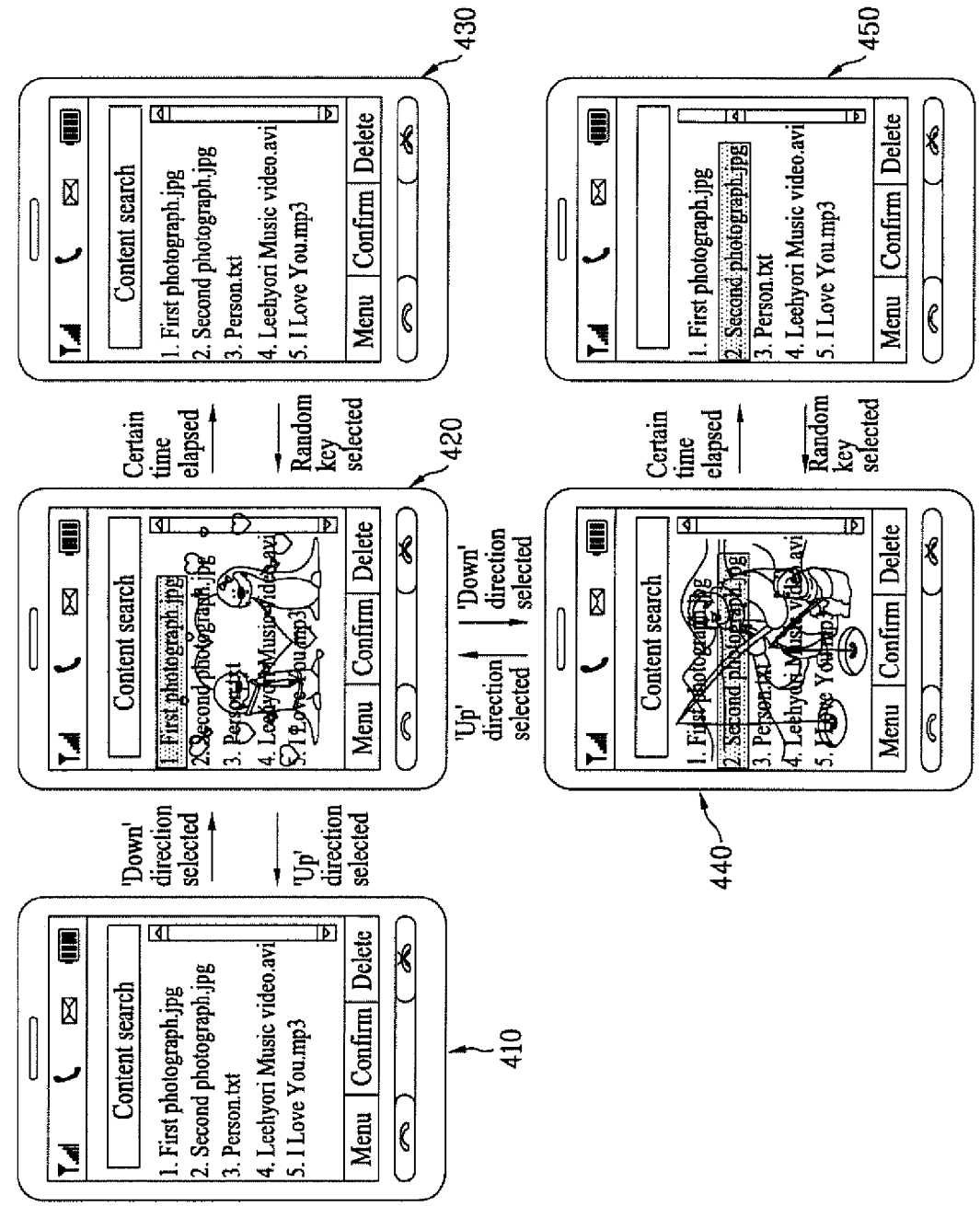
FIG. 4A depicts various displays outputting data contained in a content as background media according to an embodiment of the present invention.

As illustrated in FIG. 4A, the mobile terminal 100 displays a list of content, referred to hereinafter as a 'content list', on the screen as it enters the content search mode (410).

If 'First Photograph.jpg' is selected by the user from among the displayed content, the terminal 100 displays video data contained in the 'First Photograph.jpg' as the background picture (420). At this time, the video data contained in the 'First Photograph.jpg' is displayed on the opaque area and the contents list is displayed on the transparent area.

Furthermore, if a 'Down' direction key is operated once while 'First Photograph.jpg' is displayed, the mobile terminal 100 selects 'Second Photograph.jpg' located downward from the 'First Photograph.jpg' content. At this time, the video data contained in the 'Second Photograph.jpg' is displayed as the background picture (440).

Then, if the predetermined time elapses while 'First Photograph.jpg' or 'Second Photograph.jpg' is displayed, the terminal 100 stops the display of the video data contained in the 'First Photograph.jpg' or 'Second Photograph.jpg', respectively (430) (450).

When the selected content is an audio file, the mobile terminal 100 outputs audio data contained in the audio file as a background audio (S244). Here, the background audio refers to a background music of the mobile terminal.

As illustrated in FIG. 4B, if the 'Down' direction key is operated four times while 'First Photograph.jpg' is displayed, the mobile terminal 100 selects 'I Love You.mp3' placed fourth downward from the 'First Photograph.jpg' and outputs audio data contained in the 'I Love You.mp3' as the background music through a speaker (462) (460).

At this time, the mobile terminal 100 may display information about the 'I Love You.mp3' content. For example, artist information, composer/songwriter, song word or lyrics, CD information, etc. may be displayed as the background picture, or an equalizer image may be displayed based on the output of the 'I Love You.mp3' (460).

If the predetermined time elapses while 'First Photograph.jpg' is displayed, the terminal 100 stops the output operation of the audio data contained in the 'I Love You.mp3' content (470).

Alternatively, when the selected content is a video/audio file, the terminal 100 outputs video data contained in the video/audio file as the background video and audio data contained in the video/audio file as the background audio (S246).

Figure 4C:
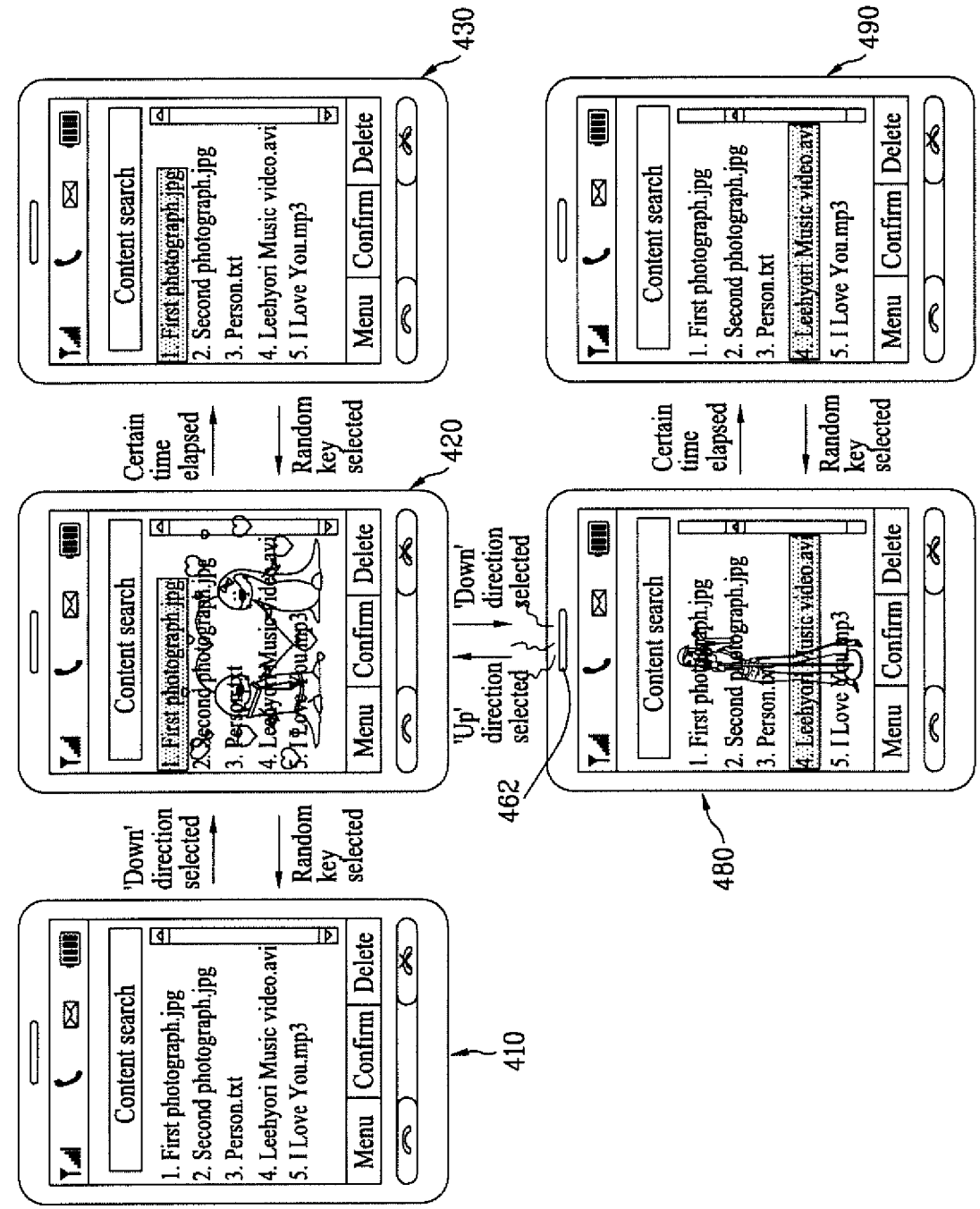
FIG. 4C depicts various displays outputting data contained in a content as background media according to still another embodiment of the present invention.

As illustrated in FIG. 4C, if the 'Down' direction key is operated three times while 'First Photograph.jpg' is displayed, the mobile terminal 100 selects 'Leehyori Music Video.avi' located third downward from the 'First Photograph.jpg' content, and displays video data contained in the 'Leehyori Music Video.avi' as the background picture and outputs audio data contained in the 'Leehyori Music Video.avi' as the background music (480).

Thereafter, if the predetermined time elapses while 'First Photograph.jpg' is displayed, the mobile terminal 100 stops the output operation of the video data and audio data contained in the 'Leehyori Music Video.avi' (490).

The embodiments of the present invention, as described above, are applicable to all mobile terminals capable of providing content stored therein to the user. More particularly, the embodiments of present invention are also applicable to a mobile communication terminal capable of exchanging and processing signals with an external terminal or server over a wired/wireless network, such as a mobile phone, a smart phone, a personal digital assistant (PDA), a notebook computer, etc.

As apparent from the above description, the content search method and the mobile terminal 100 with the same according to the present invention have several benefits. First, data contained in a specific content can be provided to the user in the content search process even before execution of the content. Second, data contained in a content selected in the content search process can be outputted as background media Therefore, it is possible to provide data contained in a specific content at the same time as displaying a contents list.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying content in a mobile terminal, the method comprising:
    displaying, on a display of the mobile terminal, a content list including a seperate name for each of a plurality of different content items, wherein the name for each of the plurality of different content items is individually associated with a name of a content file of a plurality of content files;
    displaying, on an entire display area of the display, content of a preview in response to user selection of a first item of the plurality of different content items, wherein the displayed content of the preview is obtained from the content file of the first item, and wherein the displayed content of the preview and the displayed content list overlap;
    terminating the displaying of the content of the preview;
    continuing to display the content list after the terminating of the displaying of the content of the preview,
    wherein:
    the content is displayed on a transparent area of the display and the content of the preview is displayed on an opaque area of the display, and
    the transparent area of the display and the opaque area of the display form a multilayer structure,
    the terminating the displaying of the content of the preview occurs after a defined time period following the displaying of the content of the preview without any user input, the content file of the first item includes a music file and the music file is outputted as a background music of the content list, and the content of the preview includes lyrics of the music file and an equalizer image based on the output of the music file and the lyrics and the equalizer image are displayed as a background image of the displayed content list.

2. The method of claim 1, wherein the content of the preview further includes a video and the method further comprises:
displaying the video as a background video; and
outputting audio data associated with the video.

3. The method of claim 1, further comprising requesting a content search mode based on received input.

4. The method of claim 1, wherein the content of the preview further includes content of a video file, an audio file, a text file, a flash file, or a video/audio file.

5. The method of claim 1, wherein the content of the preview is displayed as a background media of the displayed content list.

6. The method of claim 1, wherein the content of the preview is simplified version of a video file when the content file of the first item is associated with the video file.

7. The method of claim 1, wherein the content of the preview is displayed in an inset window that overlaps the displayed content list.

8. The method of claim 1, wherein the content of the preview is displayed in a certain area of the display, the certain area designated by a user.

9. The method of claim 1, wherein each of a plurality of the content items is associated with a different file type.

10. The method of claim 1, wherein the content list identifies each of the plurality of different content items by an identifier.

11. The method of claim 1, wherein the content of the preview is a video that is executing.

12. The method of claim 1, wherein the content of the preview is an image.

13. The method of claim 1, wherein the displayed content of the preview and at least one second item of the displayed content list overlap.

14. A mobile terminal comprising:
a display; and
a controller configured to:
cause displaying on the display a content list comprising a separate name for each of a plurality of different content items, wherein the name for each of the plurality of different content items is individually associated with a name of a content file of a plurality of content files;
cause displaying on an entire display area of the display content of a preview in response to user selection of a first item of the plurality of different content items, wherein the displayed content of the preview is obtained from the content file of the first item, and wherein the displayed content of the preview and the displayed content list overlap;
terminate the displaying of the content of the preview; and
cause the display to continue to display the content list after the terminating of the displaying of the content of the preview,
wherein:
the content list is displayed on a transparent area of the display and the content of the preview is displayed on an opaque area of the display,
the transparent area of the display and the opaque area of the display form a multilayer structure,
the terminate the displaying the content of the preview occurs after a defined time period following the displaying of the content of the preview,
the content file of the first item includes a music file and the music file is outputted as a background music of the content list, and
the content of the preview includes lyrics of the music file and an equalizer image based on the output of the music file and the lyrics and the equalizer image are displayed as a background image of the displayed content list.

15. The mobile terminal of claim 14, wherein the content of the preview further includes a video and wherein the controller is further configured to:
cause the display to display the video as a background video; and
output audio data associated with the video.

16. The mobile terminal of claim 14, wherein the content of the preview further includes content of a video file, an audio file, a text file, a flash file, or a video/audio file.

17. The mobile terminal of claim 14, wherein the content of the preview is displayed as a background media of the displayed content list.

18. The mobile terminal of claim 14, wherein the content of the preview is a simplified version of a video file when the content file of the first item is associated with the video file.

19. The mobile terminal of claim 14, wherein the content of the preview is displayed in an inset window that overlaps the displayed content list.

20. The mobile terminal of claim 14, wherein the content of the preview is displayed in a certain area of the display, the certain area designated by a user.

21. The mobile terminal of claim 14, wherein each of a plurality of the content items is associated with a different file type.

22. The mobile terminal of claim 14, wherein the content list identifies each of the plurality of different content items by an identifier.

23. The mobile terminal of claim 14, wherein the content of the preview is a video that is executing.

24. The mobile terminal of claim 14, wherein the content of the preview is an image.

25. The mobile terminal of claim 14, wherein the displayed content of the preview and at least one second item of the displayed content list overlap.

* * * * *